G. C. BEAL.
Seeding and Fertilizing Attachment for Plows.

No. 221,498. Patented Nov. 11, 1879.

Witnesses:
J. W. Garner
Otto Stein.

Inventor:
Geo. C. Beal
per
F. A. Lehmann,
Atty.

UNITED STATES PATENT OFFICE.

GEORGE C. BEAL, OF WASHINGTON, GEORGIA.

IMPROVEMENT IN SEEDING AND FERTILIZING ATTACHMENTS FOR PLOWS.

Specification forming part of Letters Patent No. 221,498, dated November 11, 1879; application filed October 18, 1879.

*To all whom it may concern:*

Be it known that I, GEORGE C. BEAL, of Washington P. O., in the county of Wilkes and State of Georgia, have invented certain new and useful Improvements in Seeding and Fertilizer Attachments for Plows; and I do hereby declare the following to be a full, clear, and exact description of the invention, such as will enable others skilled in the art to which it pertains to make and use it, reference being had to the accompanying drawings, which form part of this specification.

My invention relates to an improvement in seeding and fertilizer attachments for plows; and it consists in the arrangement and combination of devices that will be more fully described hereinafter, whereby the seed, of whatever kind, is deposited in the ground at the same time as the fertilizer.

Figure 1:
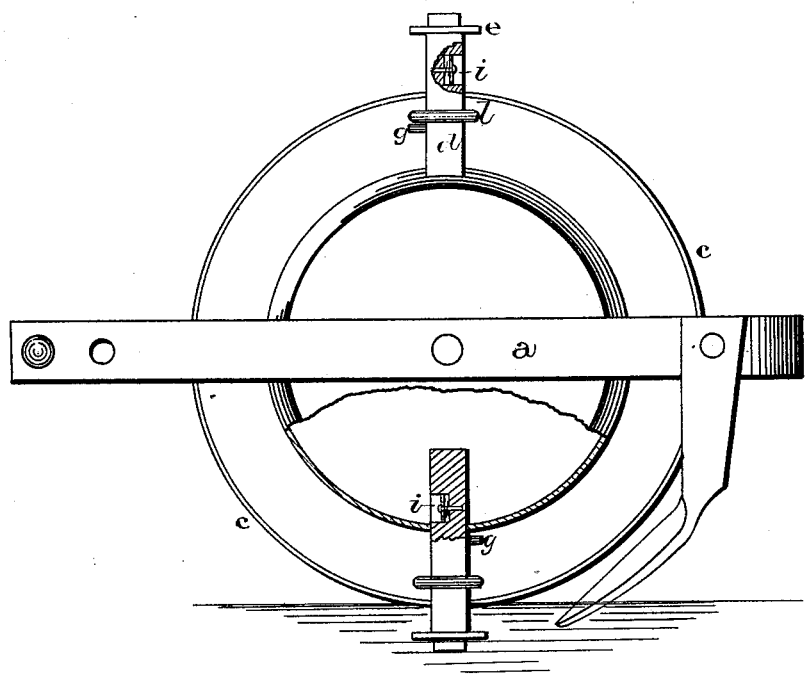
Figure 2:
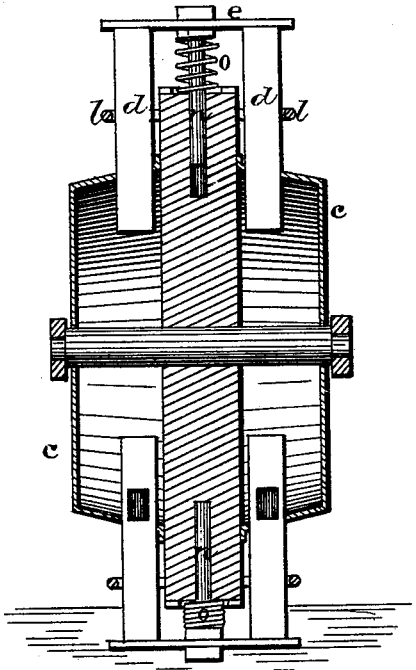

Figure 1 is a side elevation of my invention, partly in section. Fig. 2 is a vertical cross-section of the same.

$a$ represents a suitably-shaped iron frame, which is bolted, or otherwise secured, to the rear of the plow standard or stock. Pivoted in this frame is the revolving hopper $c$, which consists of a solid disk in the center, and a compartment on one side of it for corn, cotton, or other suitable seed, and a compartment on the other side for guano. Projecting any suitable distance inward toward the center of these two compartments are the rods $d$, which are rigidly fastened together at their outer ends by the plates $e$, and which are provided with suitable stops $g$, to prevent them from moving too far inward. Each one of these rods is made with a seed or guano cavity, $i$, which, as the rods are forced inward by the revolution of the hopper, become filled with grain or guano, to be dropped in the furrow as soon as the springs force the rods outward. These seed and guano cavities may be made of any desired size, and are provided with any suitable devices for regulating the size of them, according to the amount it is desired to drop in a hill.

These feed-rods are kept straight in their movements by the guides $l$, and by a rod, $n$, which is secured to the center of the plate $e$ and projects into the edge of the disk. Around these rods $n$ are placed the springs $o$, which, as soon as the weight of the hopper is taken from the rods by its onward movement, force the rods outward, so that the seed and guano in the cavities will be dropped in the furrows and covered over by the two coverers secured to the rear end of the frame.

The grain and guano are not dropped together in the same pile, but are separated from each other by the width of the central disk, so that the guano cannot kill the sprouting grain, which it is apt to do when they are dropped together in the same hole.

This machine runs directly behind the plow-standard, and it drops both the grain and guano at the same time and covers them.

I claim—

A seeding and guano attachment for plows, composed of a suitable frame, for attachment to the plow-standard, and a revolving hopper, having a dividing-disk in the center and a grain-compartment on one side and a guano-distributer on the other, in combination with the seed-rods, united together at their outer ends and made to move outward by suitable springs, substantially as shown and described.

In testimony that I claim the foregoing I have hereunto set my hand this 18th day of October, 1879.

GEO. C. BEAL.

Witnesses:
OTTO STEIN,
F. A. LEHMANN.